Dec. 13, 1938.    V. I. MYLLYNIEMI ET AL    2,140,027
SAFETY DEVICE FOR HYDRAULIC BRAKES
Filed Oct. 10, 1936

INVENTORS
VÄINÖ ILMARI MYLLYNIEMI
VILHO SAKARI MÄKI
BY
Richards & Geier
ATTORNEYS Patented Dec. 13, 1938

2,140,027

UNITED STATES PATENT OFFICE 2,140,027

SAFETY DEVICE FOR HYDRAULIC BRAKES

Väinö Ilmari Myllyniemi and Vilho Sakari Mäki, Lappeenranta, Finland

Application October 10, 1936, Serial No. 104,940
In Finland September 16, 1936

3 Claims. (Cl. 303—84)

The invention relates to a hydraulic brake installation, such as hydraulic four-wheel brakes upon an automobile and more particularly to hydraulic brakes wherein a displacement of a liquid in a master cylinder will cause a movement of said liquid through suitable tubes to the cylinders associated with the four-wheels of an automobile for actuating the brake bands.

In hydraulic brake installations of the aforesaid type, it is desirable to provide some means whereby, in the event of rupture in one of the individual lines, all of the fluid which transmits the pressure will not be lost through that rupture, thus rendering the system inoperative. This danger is present particularly in connection with four-wheel brake systems, for if a rupture occurs in the line leading to one brake the entire complement of brakes will be rendered inoperative. This fact may result in serious accidents unless some safety means is provided.

It is, therefore, the object of this invention to provide means which will prevent accidents to automobiles and injury to the passengers through the possible failure of the brakes to operate.

Another object is to provide a safety valve unique in construction and so arranged that if a rupture occurs behind the valve, that line only will be put out of operation, and the pressure will be retained to permit operation of the other brakes.

Still another object is to provide a safety valve which will be maintained in an open position to permit an uninterrupted flow of fluid during the normal operation of the brake system due to balanced pressure on opposite ends and which will be closed automatically when the pressure becomes unbalanced.

A further object is the provision of a device of the character described, which is simple in construction and reliable in operation and which will permit easy adjustment and equalization of the braking effect of the various brakes.

Further objects and advantages inherent in the present invention will become apparent as the specification proceeds and when taken in connection with the accompanying drawing illustrating a preferred embodiment of the inventive idea.

In the drawing:—

Figure 1:
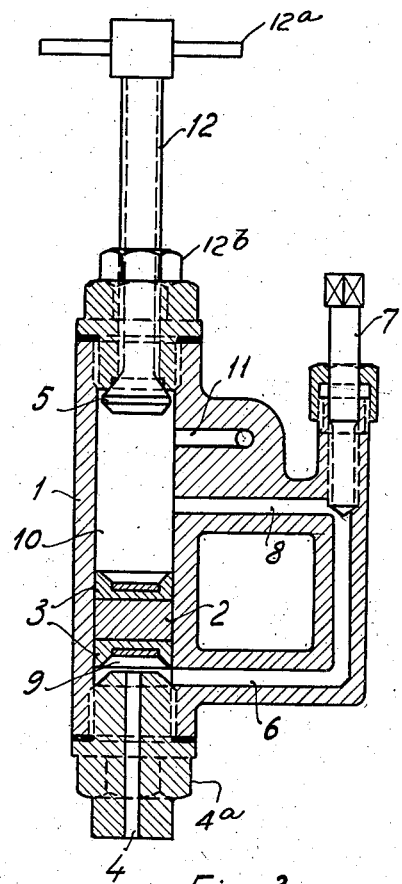
Figure 1 is a vertical section of a safety device embodying the invention taken along the line A—B of Fig. 3.
Figure 2:
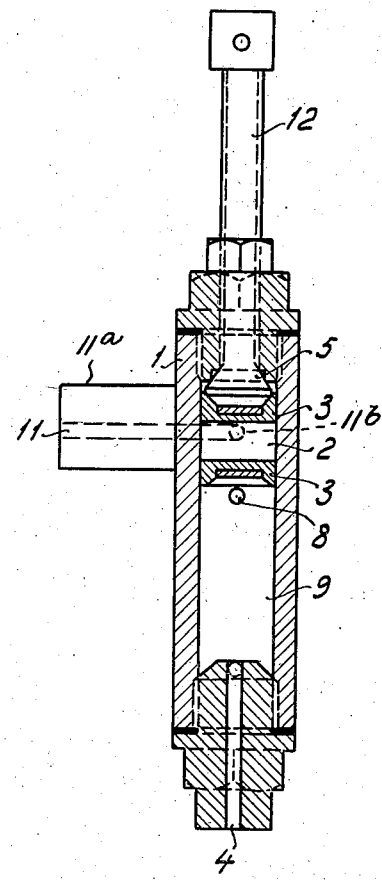
Figure 2 is a vertical section along the line C—D of Fig. 3.
Figure 3:
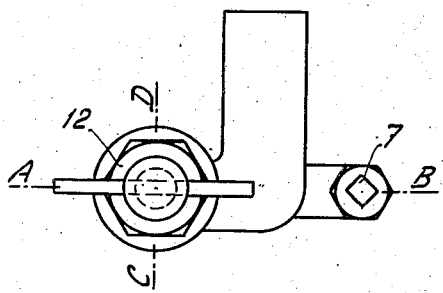
Figure 3 is a top plan view of the device.

As the device according to the present invention may be connected to various types of fluid operating brake systems, it is not deemed necessary to illustrate the particular brake system of an automobile. It will be understood, therefore, that the conduit 4 may be designated as the pressure supply conduit, and the conduit 11, the pressure transmitting conduit leading to the brake cylinder which is not shown in the drawing.

The device consists of a casing 1 comprising a cylinder divided into two sections 9 and 10 by means of a piston 2 which is freely movable therein from the position of rest indicated in Figure 1 to the opposite end of the cylinder to close the conduit 11 when a rupture occurs in the pressure transmitting conduits. The piston 2 may be provided with expanding gaskets 3 in order to seal the parts 9 and 10 of the cylinder.

The casing 1 may be connected to the conduits 11 and 4 by any suitable means such as nipples 4a and 11a. As it is more convenient that the outlet be at an angle to the inlet, the opening 11b is preferably formed in one side of the cylinder. The by-pass 6—8 permits uninterrupted flow of the operating fluid to the brake cylinder through the conduit 11. The duct 6 leads from a point adjacent the outlet below the position of rest of the piston 2 and the duct 8 terminates in the portion 10 above the normal position of rest of the piston 2. Thus, it will be understood that during the normal operation of the brake system, the piston 2 will remain in its position of rest as shown in Fig. 1 with a possible slight displacement due to the elasticity of the fluid.

The needle valve 7 serves to regulate or control the brake fluid running through the by-pass 6—8 whereby the braking effect of the respective brake may be adjusted. It will be understood that this valve is normally open to provide for the desired braking effect.

The buffer 5 is connected to the stem 12 which extends outside the casing 1 and is provided with a handle 12a to permit manual operation thereof. The stem 12 is connected to the casing by means of the guide bolt 12b and is preferably screw threaded. This screw or stem serves to return the piston 2 to its normal position after a rupture has been repaired as will be hereinafter described.

In the normal operation of the device, the pressure applied through the conduit 4 will escape through the ducts 6 and 8. The pressure will thus be transmitted to the brake cylinder through the conduit. In this manner the pressure on either side of the piston will be substantially equal and the piston will remain in its position of rest.

If the brake cylinder should be damaged or a rupture occur in the pressure transmitting conduit, the pressure in the conduit 11 as well as in the portion 10 of the cylinder and the duct 8 will be reduced.

The diminished resistance will increase the velocity of the flow of liquid through the conduit 4a to such an extent that the pressure cannot escape through the by-pass and the valve 7. The piston will, therefore, be pushed towards the opposite end against the buffer 5 to close the outlet 11b thus automatically putting the defective brake out of operation. It will be noticed that the inoperative condition of the damaged brake will not in any manner affect the remaining brakes.

When repairs are made to the damaged parts, the buffer is screwed down to push the piston back to its original position. It will be noted that due to the conical shape of the piston and the beveled edges of the nipple, the piston may be screwed down tightly to completely seal the conduit floor, thus preventing an escape of pressure during the repairs. After the repair has been completed the buffer 5 is screwed back to its position in the upper part of the cylinder and the piston 2 will resume its normal position of rest.

It will be understood that the invention is not limited to the exact details of the construction as described herein but may be varied within the limits of the appended claims without departing from the spirit of the invention.

Having now particularly described and ascertained the nature of our said invention and in what manner the same is to be performed, we declare, that what we claim is:—

1. In a fluid operated brake system, a cylinder having an inlet conduit and an outlet conduit formed therein, and a chamber formed in said cylinder and having a portion communicating with said inlet conduit, another portion communicating with said outlet conduit and an intermediate portion, a by-pass formed in said cylinder and having an inlet communicating with the first-mentioned portion of said chamber and an outlet communicating with the second-mentioned portion of said chamber, and a sealing piston of uniform diameter freely movable within the entire chamber and maintained normally in the intermediate portion of said chamber by the fluid flowing from the first-mentioned portion of said chamber and through said by-pass to the second-mentioned portion of said chamber, a diminution of fluid pressure occurring in said outlet conduit and a relative increase in fluid pressure occurring in said inlet conduit due to a rupture in a brakeline causing said piston to move to the second-mentioned portion of said chamber and interrupt the connection between said outlet conduit and the outlet of said by-pass.

2. A system in accordance with claim 1, comprising a valve situated within said by-pass for regulating the operative width thereof.

3. A system in accordance with claim 1, comprising expanding gaskets carried by said piston and projecting members situated in the first-mentioned and the second-mentioned portions of said chamber, said gaskets fitting upon said projecting members.

VÄINÖ ILMARI MYLLYNIEMI.
VILHO SAKARI MÄKI.